R. A. GOELKEL & W. N. LURCOTT.
EYEGLASS CASE.
APPLICATION FILED SEPT. 21, 1917.
1,277,210.
Patented Aug. 27, 1918.
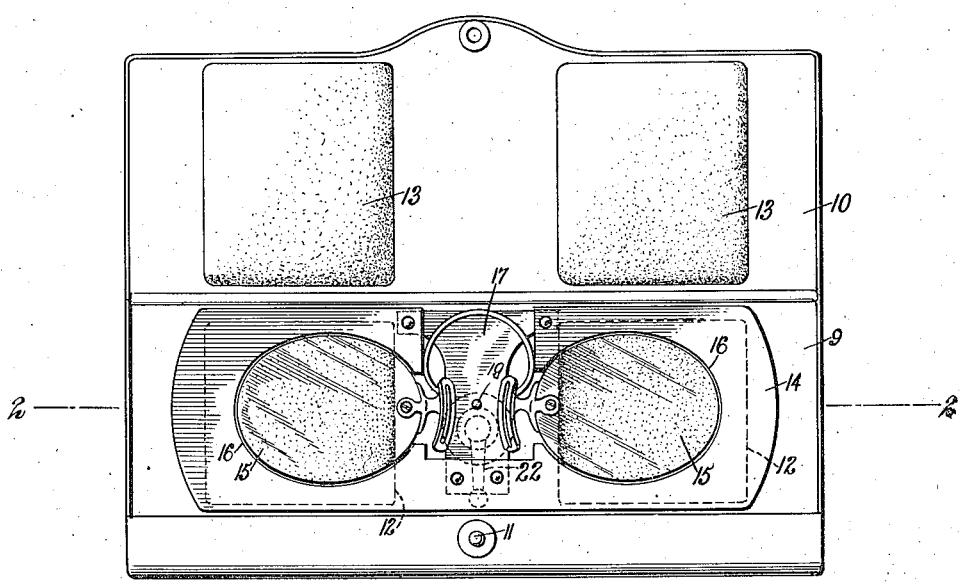
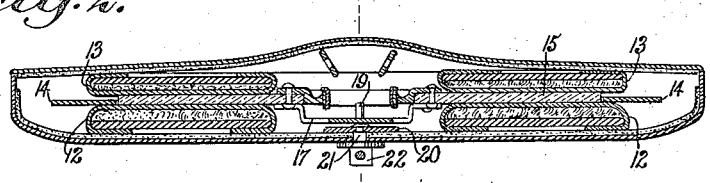
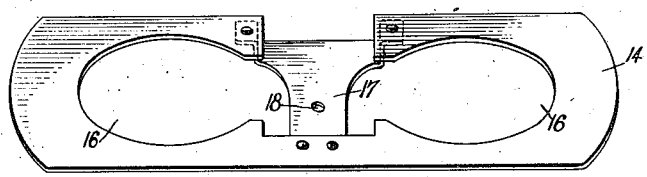
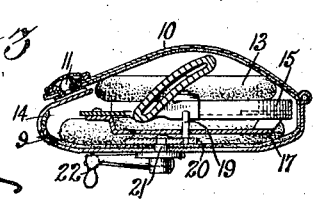
WITNESSES
INVENTORS
R. A. Goelkel
W. N. Lurcott
BY
ATTORNEYS

UNITED STATES PATENT OFFICE.

RINALDO A. GOELKEL, OF NEW YORK, N. Y., AND WINFRED N. LURCOTT, OF WEEHAWKEN, NEW JERSEY; SAID LURCOTT ASSIGNOR TO SAID GOELKEL.

EYEGLASS-CASE.

1,277,210.  Specification of Letters Patent.  Patented Aug. 27, 1918.

Application filed September 21, 1917. Serial No. 192,606.

*To all whom it may concern:*

Be it known that we, RINALDO A. GOELKEL, a citizen of the Republic of Colombia, and a resident of the city of New York, borough of Manhattan, in the county and State of New York, and WINFRED N. LURCOTT, a citizen of the United States, and a resident of Weehawken, in the county of Hudson and State of New Jersey, have invented a new and Improved Eyeglass-Case, of which the following is a full, clear, and exact description.

Among the principal objects which the present invention has in view are: to facilitate the wiping of the lenses of eyeglasses while in the carrying case therefor; and to simplify the construction of the mechanism by which the above-stated object is effected.

Drawings.

Figure 1 is a view of an eyeglass case constructed and arranged in accordance with the present invention, the case being shown in its open condition and as having disposed therein a pair of eyeglasses;

Fig. 2 is a longitudinal section of the case, the section being taken as on the line 2—2, showing the case as closed;

Fig. 3 is a cross section taken as on the line 3—3 in Fig. 2;

Fig. 4 is a detail view in perspective showing the container for the eyeglasses.

Description.

As seen in the drawings, the case 9 is of conventional form having a hinged cover 10 and a fastener 11 also of usual construction and arrangement. The retainers of the case 9 and cover 10 are provided with pads 12 and 13. The pads 12 and 13 are disposed in paired relation, being so arranged that when the cover 10 is closed on the case 9, the said pads are juxtaposed. The pads 12 and 13 are constructed of any suitable material having a resilient body so that they normally press on the holding frame 14 and the glass lenses 15 when disposed in said holding frame.

As seen best in Fig. 4 of the drawings, the holding frame 14 is provided with recesses 16. The holding frame 14 is constructed of any resilient light material, such as celluloid or fiber. Rigidly secured to the under side thereof and offset therefrom is a bridge 17 having centrally disposed therein a perforation 18. The perforation 18 is provided for engaging a post 19, which, as shown best in Fig. 3 of the drawings, is rigidly attached to a crank disk 20. The crank disk 20 is rigidly mounted on a shaft 21.

The construction above outlined furnishes means for moving the frame 14 and lenses 15 when contained therein, lengthwise and crosswise of the case 9, between the pads 12 and 13. The circular movement of the post 19 imparts an erratic motion to the frame 14, owing to the unequal frictional engagement of the pads 12 and 13 on the various lenses, and on the same lenses in various positions. This motion generally results in what may be termed a wabbling action on the part of the frame 14 and the lenses contained therein, which action has been found to most efficiently polish the lenses 15 when held between the pads 12 and 13.

The crank 22 is yieldingly connected with the shaft 21 so that the handle of the crank may be turned flat on the side of the case 9, thereby avoiding any obstruction which would prevent the case being deposited in the pocket of the owner of the glasses.

When desired, the frame 14 may be removed from the case 9, it being necessary only to lift the case therefrom. This affords freedom in cleaning the surfaces of the pads 12, which might otherwise be obstructed.

Claims.

1. The combination of a case having pivotally connected coacting sections; a plurality of rubbing members disposed in paired relation for superposition when the case is closed; a movable frame for holding eyeglasses; and means for moving said frame and eyeglasses when said sections are closed one on the other.

2. The combination of a case having pivotally connected coacting sections; a plurality of rubbing members disposed in paired relation for superposition when the case is closed; a movable frame for holding eyeglasses; and means for moving said frame and eyeglasses when said sections are closed one on the other, said means embodying a manually engaged actuating member extending beyond said case when said sections are closed.

3. The combination of a case having pivotally connected coacting sections; a plurality of rubbing members disposed in paired relation for superposition when the case is closed; a movable frame for holding eyeglasses; and means for moving said frame and eyeglasses when said sections are closed one on the other, said means embodying a crank-like member disposed exterior to said case, a shaft operatively connected with said crank-like member and extending within said case, and means connecting said movable frame and said shaft at a point eccentric to said shaft.

4. The combination of a case having pivotally connected coacting sections; a plurality of rubbing members disposed in paired relation and fixedly attached each to one of said sections to impinge upon each other or interposed object when said sections are closed; holding means for engaging eyeglasses when placed in said case for shifting the same when held between said members; and operating means for shifting said holding means, said operating means embodying a crank-like device extending exterior to said case.

5. The combination of a case having pivotally connected coacting sections; a plurality of rubbing pads, said pads being disposed in paired relation, one pad of each pair being fixedly connected with one of said sections; a holding frame embodying a handle-like member having side-opened recesses formed therein for holding the lenses of eyeglasses, said frame being movable between said pads; and an operating device for moving said frame, said device having a crank member engaging said frame within said case, and a second crank member for manipulation exterior to said case.

RINALDO A. GOELKEL.
WINFRED N. LURCOTT.